United States Patent [19]

Nielsen

[11] Patent Number: 5,778,764

[45] Date of Patent: Jul. 14, 1998

[54] DRIP COFFEE MAKER COMPRISING A DEVICE FOR MEASURING GROUND COFFEE

[75] Inventor: Henrik Nielsen, Cambes En Plaine, France

[73] Assignee: Moulinex S.A., Paris, France

[21] Appl. No.: 869,904

[22] Filed: Jun. 5, 1997

[51] Int. Cl.[6] .................................................... A47J 31/00
[52] U.S. Cl. ......................... 99/285; 99/304; 99/307
[58] Field of Search ............................. 99/279, 285, 286, 99/289 R, 304, 307; 426/433

[56] References Cited

U.S. PATENT DOCUMENTS

| 4,328,740 | 5/1982 | McDonough et al. | 99/285 X |
| 5,367,948 | 11/1994 | Di Fusco et al. | 99/285 X |

FOREIGN PATENT DOCUMENTS

| 5154054 | 6/1993 | Japan | 99/285 |

Primary Examiner—Reginald L. Alexander
Attorney, Agent, or Firm—Young & Thompson

[57] ABSTRACT

A drip coffee maker comprises a housing (10), and in the housing (10) a filter holder (20) into which ground coffee (23) is to be poured. A measuring device (25) is provided for the ground coffee poured into the filter holder (20). The filter holder (20) is mounted movably in the housing, and the measuring device (25) comprises at least one deformable mechanical member (33) connected to the filter holder (20) and reacting by deformation to the quantity of ground coffee (23) poured into the filter holder. This deformable mechanical member (33) drives by its deformation a member (35) for visual indication of the desired quantity of ground coffee. The deformable member (33) is in stable position when that desired quantity of ground coffee is obtained. The deformable member (33) is comprised by four articulated arms (38a, 38b, 38c, 38d) constituting a deformable parallelogram (38), one (38a) of the arms of one of two pairs of arms of the parallelogram (38) being mechanically connected to the filter holder (20) and being connected with a resilient member (43) mounted in the housing so as to maintain in stable equilibrium the parallelogram (38) when the desired quantity of ground coffee is obtained, and one (38d) of the arms of the other pair of arms of the parallelogram (38) being connected to the visible indication member (35).

7 Claims, 2 Drawing Sheets

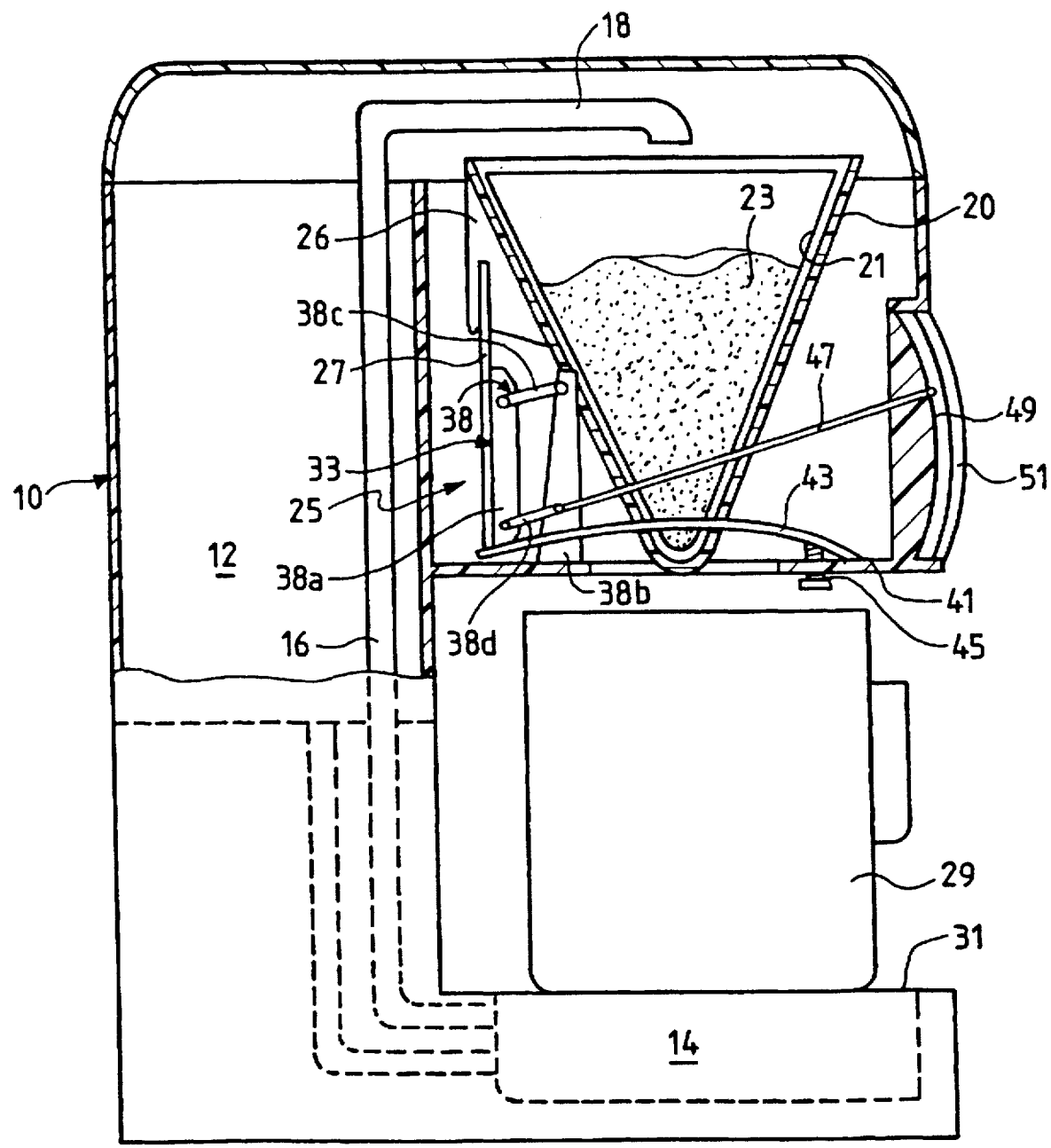
FIG_1

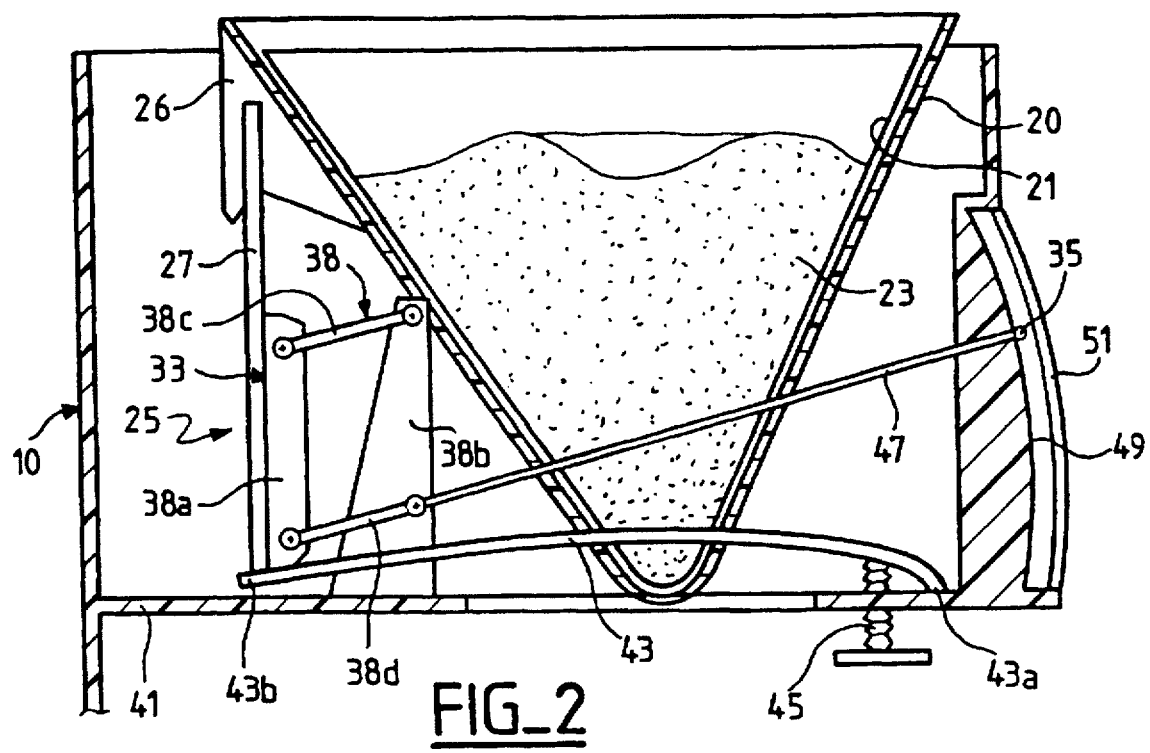
FIG_2
FIG_3

DRIP COFFEE MAKER COMPRISING A DEVICE FOR MEASURING GROUND COFFEE

BACKGROUND OF THE INVENTION

This application corresponds to French application 96/06908 of Jun. 5, 1996, the disclosure of which is incorporated herein by reference.

The present invention relates to domestic drip coffee makers comprising, in a housing, a filter holder into which is poured the ground coffee, and a measuring device for the ground coffee poured into the filter holder.

It is known that in drip coffee makers, the measurement of the quantity of ground coffee to be filtered constitutes an important operation in the preparation of good coffee because it greatly influences the strength and aromatic quality of the brewed coffee. Accordingly, the operation of measuring the ground coffee must be carried out with precision to obtain good brewed coffee, which is relatively difficult to do using only a small measuring spoon.

SUMMARY OF THE INVENTION

It has therefore been proposed to provide drip coffee makers with a device permitting defining the exact quantity of ground coffee to be filtered. A known measuring device for the ground coffee poured into the filter holder of a drip coffee maker comprises a lever mechanism connected to the filter carrier and displaceable under the action of a float movably mounted in the water reservoir of the coffee maker and acting on the level of water contained in the reservoir to reach a predetermined position in which the ratio between the quantity of water and the quantity of ground coffee poured into the filter holder is constant. However, this device for measuring the quantity of ground coffee, relying thus on the quantity of water contained in the water reservoir, is a relatively complicated structure, which is cumbersome and requires very precise dimensioning of the lever mechanism to obtain a constant water/ground coffee ratio, which is hard to arrange in mass produced coffee makers.

The invention has particularly for its object to overcome these drawbacks and to provide a drip coffee maker provided with a measuring device for the ground coffee to be filtered which will be simple, economical, independent of the quantity of water, and of high reliability.

In a drip coffee maker according to the invention, the filter carrier being mounted movably in the housing, the measuring device comprises at least one deformable mechanical member coupled to the filter carrier, reacting by deformation on the quantity of ground coffee poured into the filter carrier, and adapted to drive, by its deformation, a visual indicator of the desired quantity of ground coffee, said deformable member being in a stable position when the desired quantity of ground coffee is obtained.

Thanks to this deformable member reacting on the quantity of ground coffee poured into the movable filter holder and remaining stable as soon as the measuring operation is concluded, there is thus obtained in a simple manner a very precise measurement of the quantity of ground coffee desired by the consumer, visible from outside the coffee maker, and imparting good flavor to the brewed coffee once made.

According to a preferred embodiment, the deformable member is comprised by four articulated arms constituting a deformable parallelogram, one of the arms of one of the two pairs of the parallelogram being mechanically connected to the filter holder and being associated with a resilient member mounted in the housing so as to maintain in a stable equilibrium said parallelogram when the desired quantity of ground coffee is obtained, and one of the arms of the other pair of the parallelogram being connected to the visible indication member.

BRIEF DESCRIPTION OF THE DRAWINGS

The characteristics and advantages of the invention will become further apparent from the description which follows, by way of non-limiting example, with reference to the accompanying drawings, in which:

FIG. 1 is a schematic view, partially in elevation and partially in cross section, of a drip coffee maker comprising a device for measuring the ground coffee according to the invention;

FIG. 2 is a view on a larger scale, of the measuring device associated with the filter holder of the coffee maker of FIG. 1; and FIG. 3 is a plan view on an enlarged scale of a face graduated in the number of cups of coffee, for different predetermined strengths of coffee, and arranged on the front of the coffee maker of FIG. 1.

DESCRIPTION OF THE PREFERRED EMBODIMENT

The domestic drip coffee maker shown in FIG. 1 comprises, in a housing 10, a cold water reservoir 12, a water heater 14 supplied by this reservoir and itself supplying, through a rising hot water tube 16, a supply pipe 18 arranged above a filter holder 20 movably mounted in the housing, of which the bottom is perforated and which contains a filter element 21, such as a filter paper or a so-called permanent filter, adapted to contain a predetermined quantity of ground coffee 23, as well as a device for measuring the ground coffee poured into the filter holder 20, designated by the general reference numeral 25.

In the embodiment illustrated in FIG. 1, the filter holder 20 is mounted suspended by its rear portion 26 in a vertical member of support 27 so as to be disposed in the working position below the conduit 18, and above a receptacle 29 for collecting the infusion resting on a base 31 of the housing 10.

According to the invention, the measuring device 25 for the ground coffee to be filtered comprises at least one deformable mechanical element 33 coupled to the filter holder 20, reacting by deformation to the quantity of ground coffee 23 poured into the filter holder, and adapted to drive, by its deformation, a member 35 (FIG. 3) for visual indication of the desired quantity of ground coffee, the deformable member 33 being in stable position when the desired quantity of ground coffee is obtained.

In a preferred embodiment, the measuring device 25 comprises two mechanical deformable members 33 constituted here by two identical deformable parallelograms 35, of which only one is visible in FIGS. 1 and 2, arranged parallel and at a distance from each other in the rear portion of the filter holder 20 by being coupled each to this latter via the support member 27.

As is seen in FIG. 2, in this embodiment, each parallelogram 38 is comprised by two pairs of arms articulated to each other, namely: two large parallel arms 38a, 38b extending vertically, of which one, 38a, is mechanically connected to the filter holder 20 by being fixedly mounted on the support member 27 and of which the other 38b is mounted fixedly by its lower end on a horizontal wall 41 of the housing 10 into which opens the bottom of the filter holder 20, and two small parallel arms 38c, 38d extending transversely to the two vertical arms 38a, 38b by being articulated each to these latter by any suitable articulation means.

As to FIG. 2, the vertical arm 38a of the deformable parallelogram 38, secured to the support member 27, is associated with a resilient member constituted here by a flexible leaf spring 43 mounted in the housing 10 and adapted to maintain in a stable equilibrium the parallelogram 38 when the desired quantity of ground coffee is obtained. This leaf spring 43 is secured at one of its ends 43a on the horizontal wall 41 of housing 10 by any suitable securement means (not shown) and is mounted bearing at its other end 43b below the lower portion of the support member 27. Flexure of the leaf spring 43 is adjusted by loading means which comprise, in the embodiment illustrated in FIGS. 1 and 2, a screw 45 mounted passing through the wall 41 of the housing 10 and whose free end of its shank comes into bearing against the lower surface of the leaf spring 43, substantially at the end 43a of this latter, as is seen in FIG. 2. This screw 45 permits preferably avoiding close manufacturing tolerances of the coffee maker as well as the drifting connected to deformations of the material used, and to adapt the measuring device with a parallelogram to the type of filtering element 21 used (filter paper, permanent filter).

The assembly formed by the filter holder 20 secured to the support member 27, the leaf spring 43 and the deformable parallelogram 38 constitutes in itself a parallelogram balance permitting measuring precisely the desired quantity of ground coffee. Thus, when the ground coffee is poured into the filter holder 20, the weight of the filter holder increases, and under the influence of this weight, the support member 27 descends vertically, thus giving rise to the deformation of the parallelogram 38; the force transmitted to the support member 27 is then counterbalanced by the force of the leaf spring 43 until there is obtained the desired quantity of ground coffee for which the parallelogram 38 is in stable equilibrium.

It must be here emphasized that the deformable parallelogram 38 reacting to the poured quantity of ground coffee, could be replaced by any other mechanically deformable member and constituting in itself a weight detector, of the piezoelectric type for example, without thereby departing from the scope of the invention.

In the embodiment shown in FIGS. 1 and 2, the transverse arm 38d of the deformable parallelogram 38 is prolonged axially by a connecting rod 47 of which one of the ends is mounted fixedly on this arm 38d and whose free end is shaped as a horizontal finger constituting the member 35 for visual indication of the desired quantity of ground coffee, see FIG. 3. This finger is adapted to move in a height-wise direction, responsive to the deformation of the parallelogram 38, to come into place, when the desired quantity of ground coffee is obtained, on one selected predetermined graduation from among several graduations each of which indicates a given number of cups of coffee, for example from 1 to 10 as shown in FIG. 3, and which are inscribed in a column on the face 49 provided on the front of the housing 10 and protected by a transparent cover 51 (FIGS. 1 and 2), such that from the outside, the consumer can visualize the displacement of the finger 35 indicating the quantity of ground coffee poured into the filter holder 20.

Preferably, as shown in FIG. 3, the face 49 has several parallel graduated columns of the same number of cups of coffee, in this case three columns graduated from 1 to 10 cups of coffee, designated C1, C2 and C3 in FIG. 3, which correspond respectively, in this example, to three predetermined strengths of coffee each indicated by an identification symbol, respectively F1 ("weak" coffee), F2 ("medium" coffee) and F3 ("strong" coffee). The finger 35 overlies the three graduated columns C1, C2 and C3.

There will now be explained the operation of the measuring device described above, given for example that the consumer desires to produce four cups of coffee of "medium" strength.

When the user pours ground coffee 23 into the filter holder 20, the weight of the filter holder increases and, under the influence of this weight, the support member 27 descends vertically against the force of the leaf spring 43, thereby giving rise to the deformation of the parallelogram 38. By this deformation of the parallelogram, the arm 38d of the latter drives upwardly the horizontal finger 35 of the connecting rod 47 connected to this arm 38d of the parallelogram 38. The consumer continues to pour ground coffee into the filter holder 20 until, because of the deformation of the parallelogram 38, the finger 35 comes into position on the graduation of the column C2 of the face 49 indicating four cups of coffee of "medium" strength F2 and visible to the consumer from the outside, as shown in FIG. 3. The exact desired quantity of ground coffee being obtained, the support member 27 is therefore no longer urged, and because of this, the parallelogram 38 remains in a stable position maintained by the leaf spring 43.

It will be noted that it is possible to provide a device permitting blocking the parallelogram 38 in the desired measuring position so as to avoid any possible oscillation of the parallelogram, and hence of the indicating finger 35, during brewing.

There has thus been provided according to the invention a drip coffee maker provided with a measuring device of the ground coffee to be filtered, which is particularly advantageous not only from the point of view of its measuring position but also from the point of view of its high reliability.

What is claimed is:

1. In a drip coffee maker comprising a housing (10), and in the housing (10) a filter holder (20) into which ground coffee (23) is to be poured, and a measuring device (25) for the ground coffee poured into the filter holder (20); the improvement in which the filter holder (20) is mounted movably in the housing, the measuring device (25) comprises at least one deformable mechanical member (33) connected to the filter holder (20) and reacting by deformation to the quantity of ground coffee (23) poured into the filter holder, said deformable mechanical member (33) being adapted to drive by its deformation a member (35) for visual indication of the desired quantity of ground coffee, said deformable member (33) being in stable position when said desired quantity of ground coffee is obtained.

2. A drip coffee maker according to claim 1, wherein the deformable member (33) is comprised by four articulated arms (38a, 38b, 38c, 38d) constituting a deformable parallelogram (38), one (38a) of said arms of one of two pairs of arms of the parallelogram (38) being mechanically connected to the filter holder (20) and being connected with a resilient member (43) mounted in the housing so as to maintain in stable equilibrium said parallelogram (38) when the desired quantity of ground coffee is obtained, and one (38d) of said arms of the other pair of arms of the parallelogram (38) being connected to the visible indication member (35).

3. Drip coffee maker according to claim 2, wherein the arm (38a) for connection of the parallelogram (38) with the filter holder (20) extends vertically and is fixedly mounted on a vertical support member (27) of the filter holder, whilst the arm (38b) of the parallelogram (38) opposite said connection arm (38a) extends also vertically and is fixedly mounted in the housing (10), and the two other arms (38c, 38d) of the parallelogram (38) extend transversely to the two vertical arms (38a, 38b) and are each mounted articulatedly on said two vertical arms of the parallelogram.

4. Drip coffee maker according to claim 3, wherein the resilient member is constituted by a leaf spring (43) of which one (43a) of the ends is fixed on the housing (10) and of which the other end (43b) is mounted bearing from below on the lower end of the vertical support piece (27).

5. Drip coffee maker according to claim 4, wherein bending of the leaf spring (43) is adjusted by load means (45) disposed in the housing (10).

6. Drip coffee maker according to claim 2, wherein the visual indication member is constituted by a horizontal finger (35) which is formed at one of the ends of the connecting rod (47) mounted fixedly at its other end in prolongation of one (38d) of the two transverse arms of the parallelogram (38), and which is adapted to displace in the height-wise direction, by means of the connecting rod (47), responsive to the deformation of the parallelogram (38) to come into position, when the desired quantity of ground coffee is obtained, on a given graduation selected from plural graduations each of which indicates a given number of cups of coffee and which are inscribed in a column on a face (49) provided at the front of the housing (10) and protected by a transparent cover (51).

7. Drip coffee maker according to claim 6, wherein the face (49) has several parallel columns (C1, C2, C3) of the same number of cups of coffee which correspond respectively of different defined strengths of coffee and which are each indicated by a symbol (F1; F2; F3) for identifying the predetermined strength of coffee, the finger (35) crossing the assembly of said columns (C1, C2, C3).

\* \* \* \* \*

UNITED STATES PATENT AND TRADEMARK OFFICE
CERTIFICATE OF CORRECTION

PATENT NO. : 5,778,764
DATED : July 14, 1998
INVENTOR(S) : Henrik NIELSEN

It is certified that error appears in the above-indentified patent and that said Letters Patent is hereby corrected as shown below:

On the title page, insert Item [30] as follows:

--[30] Foreign Application Priority Data

June 5, 1996 [FR] France . . . . .96/06908--.

Signed and Sealed this

Fifteenth Day of September, 1998

Attest:

BRUCE LEHMAN

*Attesting Officer*     *Commissioner of Patents and Trademarks*